Dec. 2, 1947.  A. P. FALL  2,431,796
ROD WIPER FOR ALIGHTING GEAR
Filed Nov. 6, 1944  2 Sheets-Sheet 1
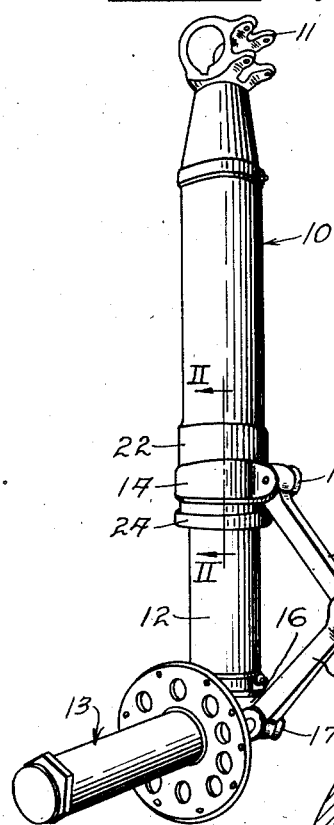
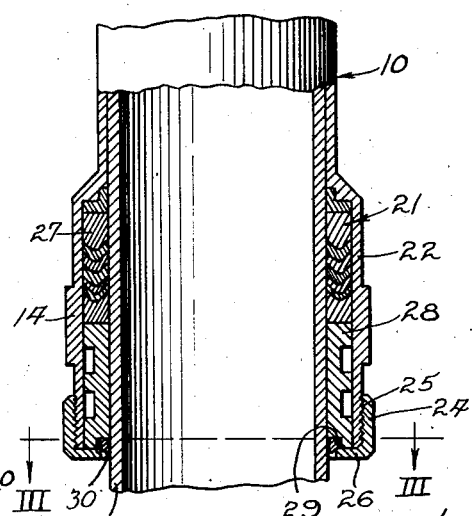
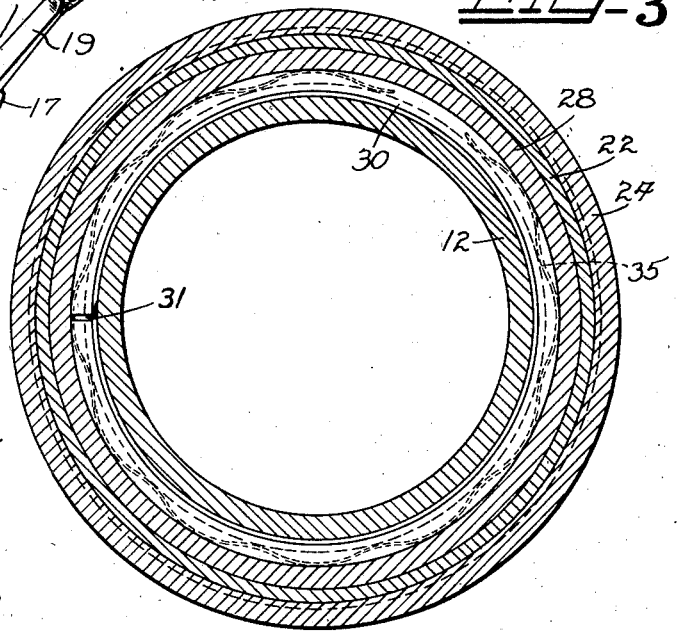
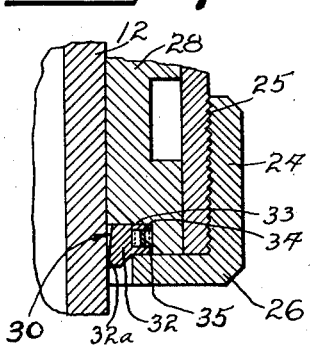
INVENTOR
Albert P. Fall

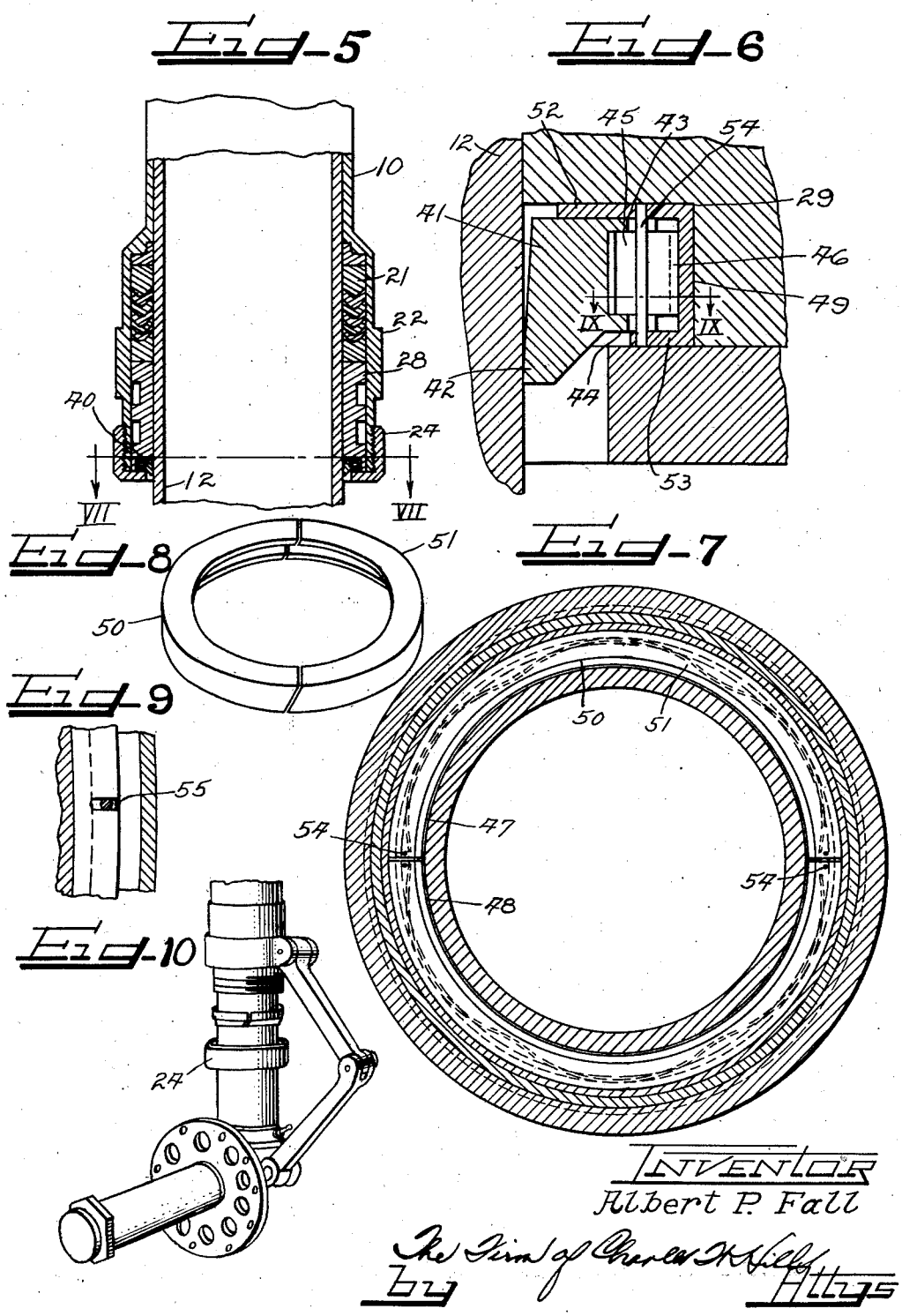

Patented Dec. 2, 1947

2,431,796

UNITED STATES PATENT OFFICE 2,431,796

ROD WIPER FOR ALIGHTING GEAR

Albert P. Fall, Toledo, Ohio

Application November 6, 1944, Serial No. 562,113

3 Claims. (Cl. 288—3)

This invention is directed to an improved scraper assembly for alighting gear for aircraft or the like and relates more particularly to an improved packing gland assembly for such a structure. This application is a continuation-in-part of my prior application Serial No. 539,970, filed June 12, 1944.

My invention has for its principal object the improvements of a scraper for a retractable alighting gear whereby such a gear is enabled to withstand extreme conditions for a greater number of flying hours than is the case with present structures.

An alighting gear of the type shown herein by way of example, includes an upper sleeve, the upper end of which may be pivotally attached to the aircraft and a lower rod, to the bottom of which the axle of the wheel is attached. This lower rod telescopes slidingly within the upper sleeve, with shock absorbing action. The shock absorbing medium within the sleeve of the strut structure is usually oil or some other satisfactory solution and thus it is necessary that an efficient seal be established between the lower, inside surface of the sleeve and the outside surface of the rod.

With the packing gland structures utilized in the past, it has been found that considerable difficulty has been experienced when the alighting gear is subjected to extreme conditions brought about by the great distances that present day aircraft travel. The ultimate in a packing gland structure is an assembly which is capable of wiping the rod perfectly clean as it slides within the sleeve to prevent dirt, grit, frost, ice or moisture from serrating or otherwise destroying the gland and also from passing through the gland upwardly into the sleeve.

It is an important object of the present invention to provide an improved packing gland assembly which not only affords an efficient seal for the operating liquid but also efficiently removes contaminating moisture, dirt or ice from the rod after it is accumulated thereon, this cleaning operation taking place during the reciprocation of the rod into the sleeve and being effective upon very thin layers of extraneous, contaminating matter.

One of the contributing factors to the difficulties which are encountered in present packing glands, is the fact that under present conditions a plane may, in a single flight, traverse areas having extreme weather conditions. For instance, a single flight may encounter extremely low temperatures whereupon frost and ice accumulate on the rod and also may traverse desert areas over which the air carries a considerable percentage of sand and grit. Previous efforts have been made to remove ice, frost and grit from the rod but it has been found that these structures ride over this extraneous material whereby it engages the sealing gland to serrate the same to initiate oil leakage.

It is another object of the present invention to provide an improved scraper assembly by which the accumulated ice is efficiently removed from the rod so that it will not be forced past the gland to serrate the same and initiate oil leakage.

It is still another object of the present invention to provide an improved packing gland assembly having a sealing gland portion and also having a wiping or scraping portion so constructed as to efficiently cut away ice and frost from the surface of the rod as it moves into the sleeve and to remove grit, moisture and oil from the surface of the rod before the wiped or scraped surface enters through the sealing gland portion.

It is another object of the present invention to provide a wiper-scraper arrangement wherein a wiper annulus is positively pressed against the telescoping rod so that it will not ride over frost, ice or grit particles but will remove the same before the rod surface slides past a companion sealing gland.

It is a still further object of my invention to provide an alighting gear with an improved wiper portion which will facilitate assembly of the wiper portion without disassembly of the gear.

More specifically, it is an object of the invention to provide, in a packing gland assembly of the above character, a split wiper annulus having an inner cutting edge and an outer compressor carrier groove housing a resilient compressor for urging the cutting edge inwardly against the surface of a telescoping rod to be wiped, the cutting edge thus being positively urged into cutting engagement with extraneous matter on the rod so that it will not ride over the same when the rod slides thereby.

Many other objects and advantages of the invention will become apparent from the following description and accompanying drawings in which:

Figure 1 is a perspective view of a landing strut assembly embodying the features of my invention;

Figure 2 is a cross-sectional view taken on the line II—II of Figure 1;

Figure 3 is an enlarged cross-sectional view taken on the line III—III of Figure 2;

Figure 4 is a fragmentary enlarged cross-sectional view of the wiper or scraper ring construction showing the manner of its attachment in the assembly;

Figure 5 is a cross-sectional view of a packing gland assembly for an alighting gear which illustrates a modification of my invention;

Figure 6 is an enlarged fragmentary cross-sectional view of the structure of Figure 5;

Figure 7 is an enlarged cross-sectional view taken along the lines VII–VII of Figure 5;

Figure 8 is a perspective view of the compressor cover of Figures 5, 6 and 7;

Figure 9 is an enlarged fragmentary cross-section taken along the lines IX–IX—of Figure 6; and Figure 10 is a perspective view of a portion of the alighting gear illustrating the method of assembly of my modified wiper structure.

It is to be understood that the embodiment shown herein is for illustrative purposes only and may be changed or modified without departing from the spirit and scope of the invention as set forth in the appended claims.

As best shown in Figure 1, the alighting gear shown herein by way of example includes an upper sleeve 10 which serves as a compression cylinder. The upper end of the sleeve or cylinder 10 is provided with a head 11 by means of which the entire alighting assembly may be pivotally secured to the associated aircraft for retraction. As will be seen from Figure 2, the lower end of the sleeve 10 is open to slidingly receive a rod 12 upon the lower end of which is mounted any suitable axle assembly 13 for receiving the aircraft wheel.

To the end that the rod 12 may slidingly reciprocate through the opened lower end of the sleeve 10 and yet will not rotate therein, a collar 14 having lugs 15 is provided in non-rotatable relationship around the lower end of the sleeve 10. Another similar collar 16 having lugs 17 is provided at the lower end of the rod 12, these collars being connected by a torque link assembly including links 18 and 19 which are pivoted together as at 20 and are pivoted at their remote ends respectively to the lugs 15 and 17. Thus it will be seen that upon application of pressure to the alighting assembly, the rod 12 will be enabled to reciprocate through the lower end of the sleeve 10, the torque linkage moving to accommodate this reciprocation and at the same time positively preventing rotation of the rod within the sleeve 10.

From the foregoing it will be seen that some means must be provided in the mechanism to prevent leakage of oil and thus loss of operating pressure through the sliding junction of the lower end of the sleeve or cylinder 10 and the adjacent portion of the outside surface of the rod 12. This is accomplished herein by means of a packing gland assembly 21 which is cylindrical in configuration and is housed within an enlarged portion 22 at the lower end of the sleeve 10.

The packing assembly is disposed within the enlarged portion 22 of the sleeve and is compressed therein by a nut 24 having an upwardly extending flange that is internally threaded to engage with external threads at the lower end of the portion 22 of the sleeve as shown at 25. The nut 24 is provided at the lower part thereof with a radially inwardly extending flange 26, the inner edge of which prescribes a circle having a diameter somewhat larger than the outside diameter of the rod 12 which passes therethrough. Thus there is provided between the edge of the flange 26 and the rod 12 an annular space available for purposes to be described presently.

In order that the packing gland assembly 21 may carry out its principal purpose, that is the provision of a tight, sliding seal between the sleeve 10 and the rod 12, a compressible sealing portion 27 made up a plurality of segments in the usual manner is provided in the upper part of the enlarged housing portion 22. The packing gland assembly is completed by the provision of an annular bearing member 28 which fits within the lower part of the enlarged housing 22 of the sleeve 10 and has an inside diameter of such a size that it slidingly receives the rod 12. This packing assembly is maintained in the sleeve as shown in Figure 2 by the attachment of the nut 24 upon the lower end of the sleeve, whereupon the flange 26 thereof is drawn upwardly against the bearing member 28 to compress the yieldable gland portion 27 into the position shown.

As indicated previously, one of the major difficulties encountered in the construction and use of telescoping alighting gears, is the entrance of sharp particles such as ice, grit and dirt into the sliding junction between the telescoping parts, whereby the sealing gland is cut and serrated and the outer surface of the rod is worn or grooved so that oil leakage is initiated. This condition then progresses more rapidly since the leaking oil picks up particles of grit whereby, during further reciprocation of the rod, destruction of the seal develops at an increasingly rapid rate. It has also been found that even a slight coating of frost upon the outer surface of the rod 12 serves to produce this undesirable condition and accordingly it is necessary to provide some means which will efficiently remove any contaminating matter whatsoever from the outer surface of the rod and leave said surface perfectly clean as it passes through the sealing gland.

To the end there is provided at the lower inside edge of the bearing member 28 a milled annular groove 29 which is arranged to receive a wiper or scraper assembly. It will be noted that since the groove 29 is positioned at the extreme lower part of the sleeve 10, the wiper assembly therein, to be described presently, will engage the surface of the wheel rod 12, during retraction thereof, before that portion of the surface so engaged passes along the compressible, destructible sealing gland portion 27. Thus the rod surface is cleaned before it passes the gland and in this manner the introduction of cutting particles or moisture into the glanded junction by retraction of the rod is eliminated.

The wiper assembly shown herein includes a wiper-scraper annulus 30 which is split as shown at 31 in Figure 3. The wiper annulus 30 includes a radially inner portion 32 which is provided with a downwardly projecting rod engaging, cutting edge 32a and a radially outer portion 33 which seats within the bearing groove 29 and is provided with a compressor groove 34 adapted to receive compression means by virtue of which the annulus 30 and particularly an edge 32a thereof is compressed resiliently against the outer surface of the rod 12 with squeeze press action. Any suitable compressor means may be utilized, however, there is shown herein an undulated or sinuous spring steel annulus 35 having a depth substantially equal to the compressor groove 34 in the wiper annulus 30, the radially inwardly extending peaks of which press against the inner wall of the groove 34 while the radially outer peaks thereof press against the radially outer wall of the bearing groove 29. Thus it will be seen that the compressor annulus 35 urges the entire wiper annulus radially inwardly with squeeze press action so that the edge 34a thereof bears inwardly against the outer surface of the rod 12 as the latter is retracted into the sleeve 10. This direction of the edge 32a of the wiper annulus is produced by a radial outward and upward inclination of the radially inner surface of the annulus 30 as shown clearly in Figure 4.

The annulus 30 is maintained in the bearing groove 29 by engagement of the radially outer part 33 thereof with the radially inner portion of the upper surface of the flange 26 on the nut 24. From Figure 4 it will be seen that as the nut 24 is screwed onto the lower end of the sleeve 10, the flange 26 is drawn upwardly until it complements the groove 29 in the bearing to engage against the radially outer part 33 of the annulus 30. As indicated previously, the radially inner edge of the flange 26 on the nut 24 is spaced from the outer wall of rod 12 to provide an annular opening. This opening, as will be seen from Figure 4 will be adapted to receive the radially inner, lower cutting edge portion of the annulus 30. With this construction it will be seen that the flange 26 of the nut 24 serves to protect the cutting edge 32a of the annulus 30 by virtue of its extension downwardly beyond that edge. In this manner it will be seen that no part of the packing gland assembly and particularly the wiping or scraping annulus thereof extends outwardly of the assembly where it might be subjected to damage.

It will be understood of course that while the compressor groove 34 shown herein is positioned substantially, vertically centrally of the radially outer portion 33 of the annulus 30, this groove may be disposed in a position vertically upwardly or downwardly of that shown to give different compression characteristics, as desired, dependent upon circumstances encountered in the use of the alighting gear.

From the foregoing it will be seen that there is provided herein a packing gland assembly which includes a resilient sealing portion and a rod cleaning portion, whereby extraneous matter, accumulated on the surface of the rod will first be removed therefrom by the annulus before the surface of the rod is drawn into contact with the resilient sealing portion of the gland.

Also it will be seen that the wiping annulus 30 and particularly the downwardly and inwardly directed cutting edge 32a thereof will be compressed inwardly by the compressor 35 housed in the groove 34 so that the cutting edge will not ride over extraneous matter on the surface of the rod 12. Instead, the edge 32a will be urged inwardly in a cutting direction.

Preferably the annulus 30, when associated with the rod 12, is slightly spread to permit inward compression thereof against the rod by compressor 35. This insures the proper amount of pressure of the cutting edge 32a against the rod and also affords a tight fit of the annulus to the rod if the latter is slightly out of round or slightly off size.

In the constructions illustrated in Figures 5 through 10, I have illustrated a modification of my invention in which the alighting gear is provided with a packing gland assembly in which the wiper portion has had various parts thereof split or formed in two parts in a particular manner which will be described hereinafter so as to facilitate the assembly thereof with the alighting gear without the necessity of disassembling the gear.

Referring to Figure 5, I have illustrated my modified wiper arrangement as applied to the telescoping members 10 and 12 similar to that shown in Figure 2 of the drawings. The sleeve 10 is provided with the enlarged housing 22 in which are placed the packing gland assembly 21, the annular bearing member 28, and the wiper ring arrangement 40 which is shown in an enlarged detail view in Figure 6. The wiper ring arrangement is placed in the peripherally extending groove 29 which faces the adjacent surface of the rod 12, but it will be understood that the wiper ring assembly may be placed in any other suitable position so that it will remove impurities carried on the surface of the rod 12 which would injure the packing gland 21 if they were allowed to remain on the outer surface of the rod 12.

The wiper assembly as is shown in Figures 6 and 7 includes a wiper-scraper annulus 41 which includes a radially inwardly extending portion 42 which is provided with a cutting edge for engaging against the adjacent surface of the rod 12. The wiper annulus also has outwardly extending flange portions 43 and 44 which are axially spaced to provide a groove 45 which is adapted to receive a compressor 46. The compressor may be of any suitable type and in the construction illustrated in the drawings there is included a spring annulus having an undulated shape similar to the compressor 35 shown in Figure 3.

In order to facilitate assembly of the wiper ring around the rod 12, without removing the rod from the member 10 a ring 41 is provided in two parts 47 and 48 as is illustrated in Figure 7. Thus, in order to assemble the wiper annulus 41 within the groove 29, it is not necessary to remove the axle assembly 13 or disassemble the links 18 and 19, as the nut 24 need merely be unscrewed and moved axially sufficiently as is illustrated in Figure 10 so that the split annulus may be inserted in the groove 29.

In order to facilitate the assembly of the semi-annular portions 47 and 48 of the wiper ring, a cover member 49 is provided which may also be split if desired or provided in two parts 50 and 51 as is illustrated more particularly in Figures 7 and 8. The half rings 50 and 51 are each provided with a channel-shape or have spaced inwardly extending flanges 52 and 53.

In order to facilitate the assembly of the two parts of the wiper ring and cover suitable openings may be provided in the halves and pins 54 pass through the slotted holes so as to hold the halves together. It will be understood that before these flanges of the wiper ring portion and the cover portion are placed contiguous in the manner illustrated in Figure 6, the spring 46 may be placed in the complementary grooves thereof. So that there may be relative movement between the wiper ring 41 and the cover, openings in the flanges 43 and 44 of the wiper ring portion are formed as slotted holes 55 as is illustrated in Figure 9.

It will also be seen particularly with reference to Figure 7 that the slits between adjacent ends of the wiper ring portions 47 and 48 and between the cover portions 50 and 51 are placed in alignment although they may be staggered if desired. It will also be understood that the amount cut from the various parts to provide the slits or portions will be approximately one-half the amount of the cut or slit 31 of the construction illustrated in Figure 3 so that the sum of the two slits will approximately equal the value of the slit 31. When it is desired to assemble the halves at the factory the compressor ring may also be made in two halves and each half assembled with the halves of the main body and cover which are pinned together as is shown in Figure 7. Such assembled halves may then be assembled with the alighting gear by unscrewing the nut 26 from the housing 22. It will be noted that the adjacent edges of the complementary parts of the wiper ring and cover may be inclined as is shown in Figures 7 and 8.

The idea of employing a compressor cover which surrounds the wiper ring and against which the compressor abuts is described and claimed more generally in my copending application, Serial No. 561,362, filed November 1, 1944. When a cover ring is provided around the wiper ring, the wiper assembly may be placed in a groove in any suitable place such as in the nut even though the nut has open slots for the reception of the prongs of a spanner wrench and the compressor will be maintained in its proper position and there will be no possibility of the compressor becoming caught in the spanner slots. Also, of course, when the compressor cover is formed of two channel-shaped members of the type illustrated in Figures 6 and 7, the assembly of the split wiper ring is facilitated.

Although I have shown and described particular embodiments of my invention, I do not desire to be limited to the particular embodiments described, and I intend in the appended claims to cover all modifications which do not depart from the spirit and scope of my invention.

I claim as my invention:

1. A scraper or wiper ring assembly for a reciprocating rod comprising a scraper ring having an inwardly projecting scraping edge and radially outwardly extending axially spaced flanges forming a groove in its convex periphery, cover means comprising a circular member of channel section arranged with its flanges lapping the outer surfaces of the ring flanges and closing the groove, said scraper ring and cover means each being formed of two parts so they may be assembled upon a rod without disassembly of the rod and its associated part, a compressor between the scraper ring and cover member of each of said parts, and pins through lapping parts of the ring and cover means to hold them together.

2. A scraper or wiper ring assembly for a reciprocating rod comprising a scraper ring having inwardly projecting scraping edge and radially outwardly extending axially spaced flanges forming a groove in its convex periphery, cover means comprising a circular member of channel section arranged with its flanges lapping the outer surfaces of the ring flanges and closing the groove, said scraper ring and cover means each being formed of two parts so they may be assembled upon a rod without disassembly of the rod and its associated parts, a compressor between the scraper ring and cover member of each of said parts, pins through lapping parts of the ring and cover means, and said ring and cover means having openings for receiving said pins, the openings in said ring being radially elongated so as not to interfere with relative radial movement of a ring and its cover means.

3. A scraper ring assembly including a resilient ring section having a scraper edge, a cover member having flanges lapping said ring section, pins through the flanges and ring section to hold them together, and a compressor member between the cover member and ring section acting against the ring section with squeeze grip action.

ALBERT P. FALL.

REFERENCES CITED

The following references are of record in the file of this patent:

UNITED STATES PATENTS

| Number | Name | Date |
| --- | --- | --- |
| 1,822,521 | Fox et al. | Sept. 8, 1931 |
| 1,837,115 | Cook | Dec. 15, 1931 |
| 1,900,437 | Durham | Mar. 7, 1933 |
| 1,992,746 | Fortune | Feb. 26, 1935 |
| 2,290,507 | Thompson | July 21, 1942 |
| 2,368,137 | Harmon | Jan. 30, 1945 |
| 2,196,089 | Wallace | Apr. 2, 1940 |
| 164,158 | Fulton | June 8, 1875 |
| 367,207 | Hughes | July 26, 1887 |

FOREIGN PATENTS

| Number | Country | Date |
| --- | --- | --- |
| 7,929 | Great Britain | 1895 |